United States Patent [19]

Ishii et al.

[11] Patent Number: 4,648,381
[45] Date of Patent: Mar. 10, 1987

[54] GAS COOKING OVEN

[75] Inventors: Toshio Ishii, 2324-4, Shirakuchi, Araki-machi, Kurume-shi, Fukuoka-ken; Yasuhisa Sakamoto; Isao Takahashi, both of Fukuoka, all of Japan

[73] Assignee: Toshio Ishii, Karume, Japan

[21] Appl. No.: 697,306

[22] Filed: Feb. 1, 1985

[30] Foreign Application Priority Data

Feb. 4, 1984 [JP] Japan .................... 59-19006
May 31, 1984 [JP] Japan .................. 59-81228[U]
Oct. 11, 1984 [JP] Japan .................. 59-214021
Dec. 10, 1984 [JP] Japan ................. 59-187511[U]

[51] Int. Cl.$^4$ ............................... A21B 1/08
[52] U.S. Cl. ....................... 126/20; 126/22; 126/286; 126/289; 99/467
[58] Field of Search ............ 126/19 R, 20, 22, 273 R, 126/285 R, 286, 289; 99/401, 467; 312/236; 34/198; 426/474, 496, 497, 510, 511

[56] References Cited

U.S. PATENT DOCUMENTS

| | | | |
|---|---|---|---|
| 1,304,755 | 5/1919 | Ellis | 126/20 X |
| 1,771,020 | 7/1930 | Thurm et al. | 126/20 |
| 2,052,060 | 8/1936 | Sperling | 126/20 |
| 2,204,045 | 6/1940 | Meacham | 126/20 X |
| 4,367,724 | 1/1983 | Willett | 126/20 |

FOREIGN PATENT DOCUMENTS 0193029 11/1983 Japan ........................... 126/39 G

*Primary Examiner*—Margaret A. Focarino
*Attorney, Agent, or Firm*—Jones, Tullar & Cooper

[57] ABSTRACT

The invention involves the generation of dry hot steam to be drawn into an oven cooking cavity where the steam is allowed to contact dough pieces on a baking plate in order to bake French bread with a glossy appearance and a hard crust, for example. In one embodiment, the cooking cavity is partitioned in the top thereof to form a steam generating chamber which receives therein a supply of water to convert it into hot steam with the heat from an upper gas burner located beneath the chamber. The upper gas burner and a lower gas burner located beneath the baking plate may be of forced combustion type and a perforated burner tube has provided along the length thereof a flame transmitting member which is divided into a plurality of segments mounted with a proper gap between two adjacent ones thereof to accommodate the thermal expansion of the segmented flame transmitting member and the tube per se. In another embodiment, the oven has a manually operable damper for selectively controlling the opening of an exhaust outlet in the rear of the oven leading to the cooking cavity. The damper is adjusted to control the amount of steam circulating in the cooking cavity depending upon the kind of foods to be baked and also in order to retain the heat of the oven to conserve fuel.

11 Claims, 15 Drawing Figures

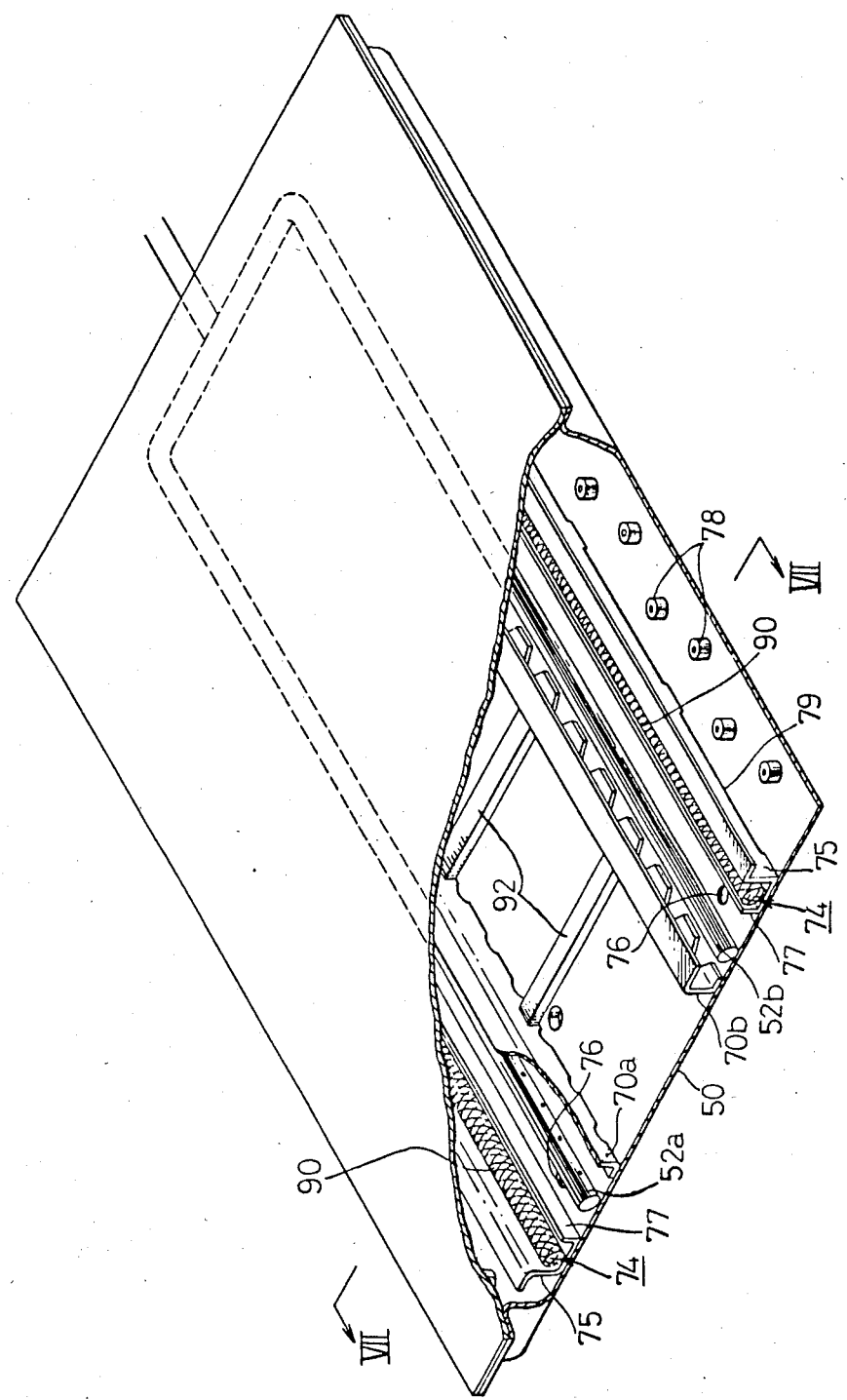

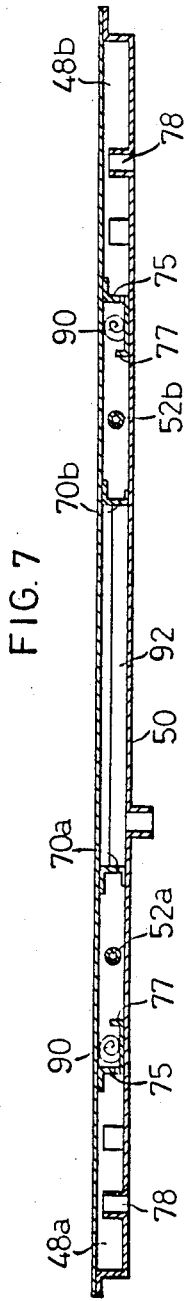
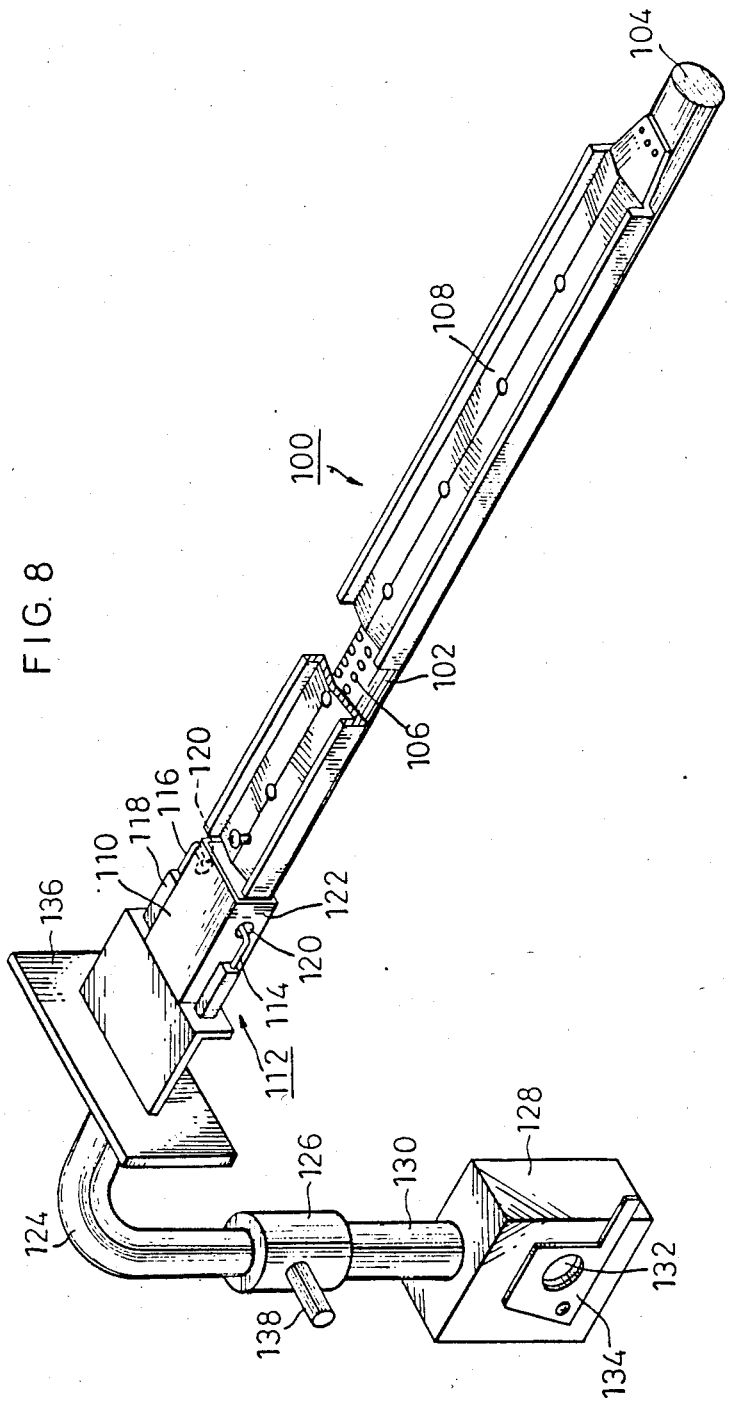
FIG. 7
FIG. 8

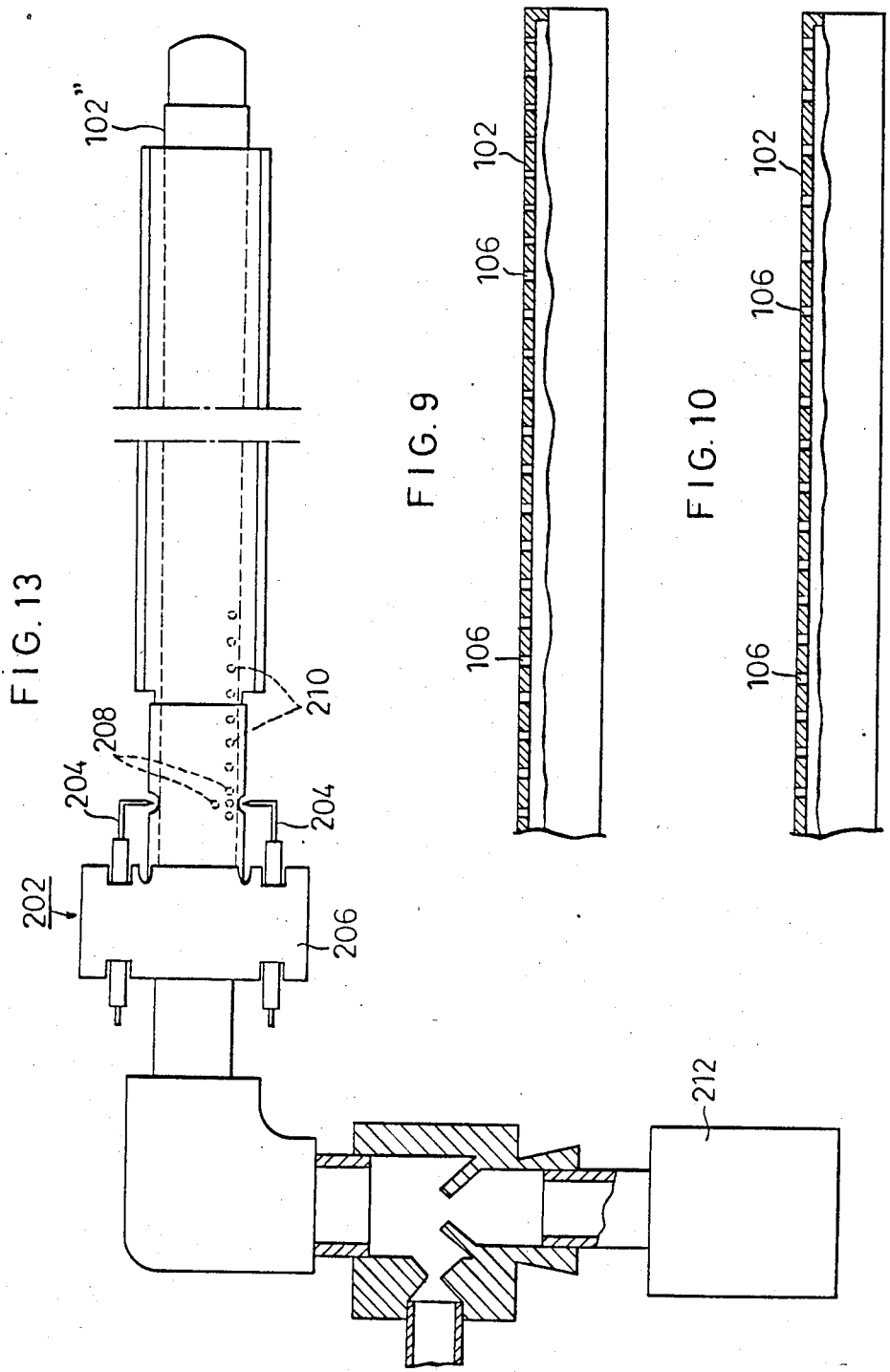

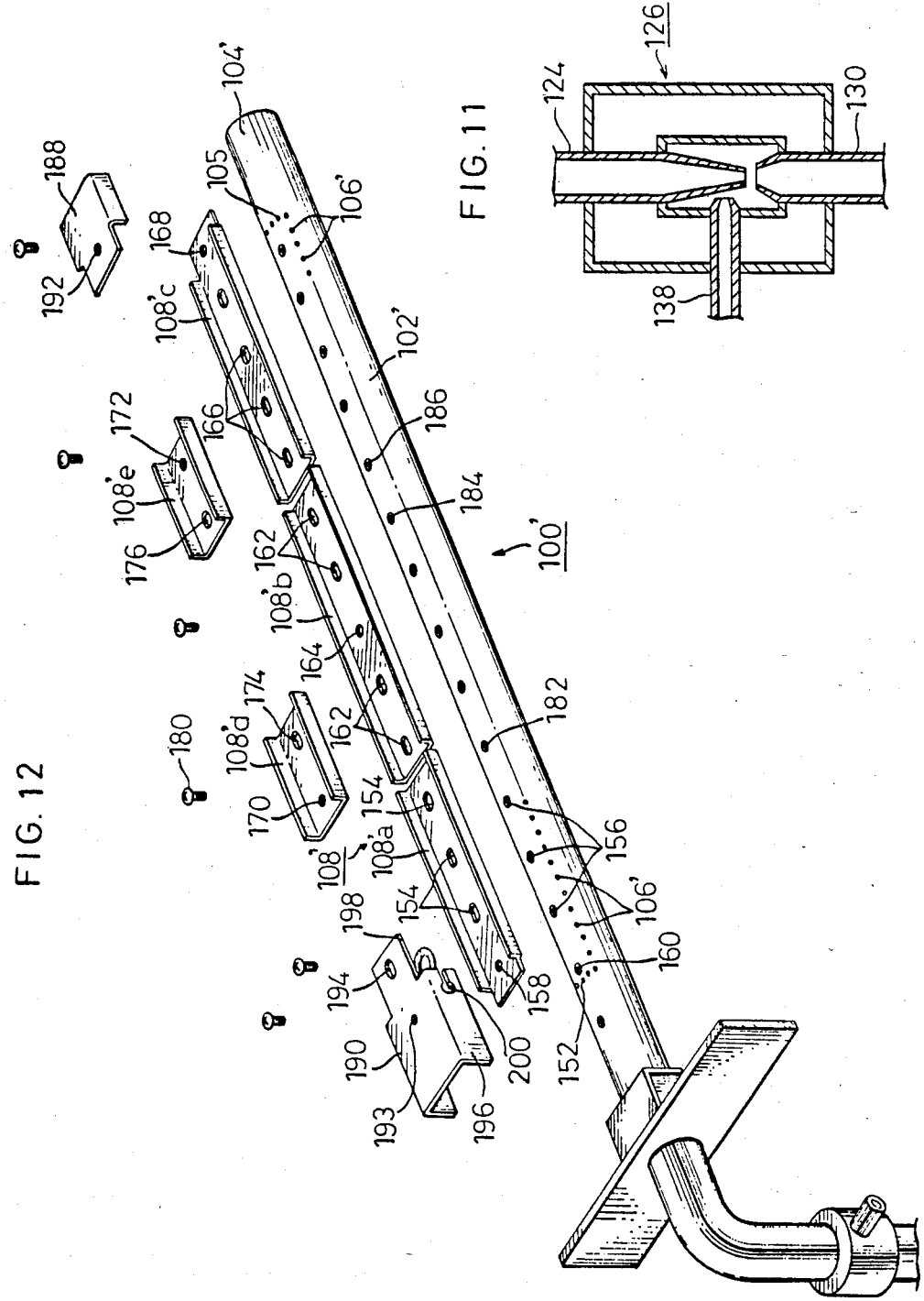

GAS COOKING OVEN

BACKGROUND OF THE INVENTION

This invention relates to gas cooking ovens and, more particularly, to an improved gas oven having a steam generating means integrally formed in the oven structure and/or a manually operable damper mechanism for controlling the amount of steam circulating in the oven cavity to bake French bread with a desired glossy appearance and hardness.

In gas ovens for the baking of French bread, a hot steam is produced and drawn into the oven cavity where it contacts dough pieces on a baking plate when passing over it. In a typical gas baking oven, a boiler is used as a steam source which is located outside the oven body. Such boiler typically is large and bulky, requiring considerable space for installation, and yet is more expensive than the oven proper. Moreover, the boiler consumes a relatively large amount of fuel such as heavy oil, gas, etc., leading to increased operating costs. A further disadvantage of this prior art arrangement is that the steam temperature tends to drop due to the heat loss from a steam conduit connecting the boiler to the oven, often resulting in a failure to bake French bread with a desired glossy appearance and hardness.

A typical gas baking oven has an exhaust means in the rear of the oven for discharging the used flue gases from the cooking cavity to the surrounding atmosphere. Such an exhaust means also discharges the steam drawn into the cooking cavity, which makes it rather difficult to control the baking operation as desired. Accordingly, it would be desirable to provide for a gas cooking oven a damper mechanism that adjusts the opening of the exhaust port as desired in order to permit a more precise control of the baking operation as well as to retain the heat of the oven so as to reduce the fuel consumption.

It is therefore the principal object of this invention to provide improved gas cooking ovens with a view to overcoming the deficiencies of the prior art.

It is another object of this invention to provide a gas cooking oven having a steam generating means integrally formed in the oven body.

It is still another object of this invention to provide a gas cooking oven having a steam generating compartment formed in the top of the oven cavity to convert the water supplied thereto into hot steam with the heat from an upper gas burner located beneath the compartment.

It is a further object of this invention to provide a gas cooking oven with a manually operable damper mechanism that is capable of controlling the amount of steam circulating in the oven cooking cavity.

It is still a further object of this invention to provide an improved gas cooking oven that enables the baking of French bread with a desired glossy appearance and hardness.

It is still a further object of this invention to provide an improved gas burner assembly having a segmented flame transmitting member with a plurality of segments spaced from each other to prevent the warpage of the flame transmitting member.

SUMMARY OF THE INVENTION

The objects stated above and other related objects in this invention are accomplished by the provision of a gas cooking oven which comprises a gas cooking oven comprising an oven body supporting a substantially box-like oven liner and a front-opening access door which defines an oven cooking cavity, a baking plate for carrying thereon foods to be baked, said baking plate being removably placed in the oven liner to form the bottom wall of the cooking cavity, a fire box located beneath the baking plate, first gas burner means positioned in the fire box, steam generating means located in the top of the cooking cavity to generate and supply a hot steam thereto, and second gas burner means located beneath the steam generating means, the steam generating means receiving the heat from the second gas burner means to generate the steam which flow into the cooking cavity and contacts the foods as it passes over the baking plate, thereby enabling the baking of the foods to have desired properties.

In a preferred embodiment of this invention, an upper gas burner supplies heat energy to an overlying steam generating compartment to generate hot steam therein. The thus generated steam is drawn into the oven cooking cavity where it contacts dough pieces on a baking plate located above the fire box thus enabling the baking of French bread with a glossy appearance and a desired hardness. The use of the upper gas burner to heat the steam generating compartment eliminates the need for a separately provided boiler which would otherwise require additional space for installation, while enabling the generation of sufficient amount of hot steam for contacing dough pieces.

In one form of this invention, the gas oven includes an exhaust port in the rear of the oven body, which is equipped with a manually operable damper mechanism for controlling the opening of the exhaust port and accordingly for adjusting the amount of hot steam circulating in the oven cavity. For example, the baking of cheese cakes, cream puffs or pudding results in generation of a relatively large amount of steam which sometimes makes it difficult to control the exposure to hot steam to obtain desired baking qualities. With the damper arrangement of this invention, it is possible to limit the exposure to hot steam by keeping the damper in such a position where the steam is allowed to exit from the oven cavity at a controlled rate while preventing an excessive loss of heat therefrom.

BRIEF DESCRIPTION OF DRAWINGS

FIG. 6 is a view similar to FIG. 4, but showing another form of steam generating compartment;

FIG. 7 is a cross sectional view taken along line VII—VII of FIG. 6;

FIG. 8 is a partly broken away, perspective view of a preferred form of gas burner assembly for use in the gas cooking oven of FIG. 1;

FIGS. 9 and 10 are fragmentary, longitudinal-sectional views showing the manner in which the burner tubes are perforated to provide gas discharge nozzles which produce a substantially equal heat output along the length of the tubes;

FIG. 11 is a fragmentary, longitudinal-sectional view of a mixer used to supply a combustible mixture of fuel gas and air to the gas burner of FIG. 8;

FIG. 12 is a perspective view, partly in disassembled form, showing a modification of the gas burner assembly shown in FIG. 8;

FIG. 13 shows a preferred form of ignition device suitable for use in the gas burner assembly;

DESCRIPTION OF THE PREFERRED EMBODIMENTS

Figure 1:
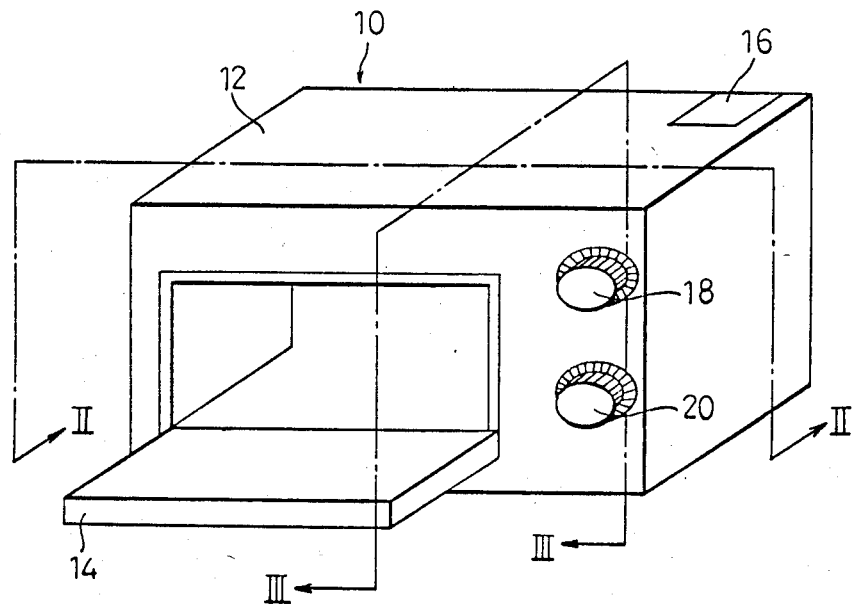
FIG. 1 is a diagrammatic, perspective view of a gas cooking oven to which the teachings of this invention could be applied.
Figure 2:
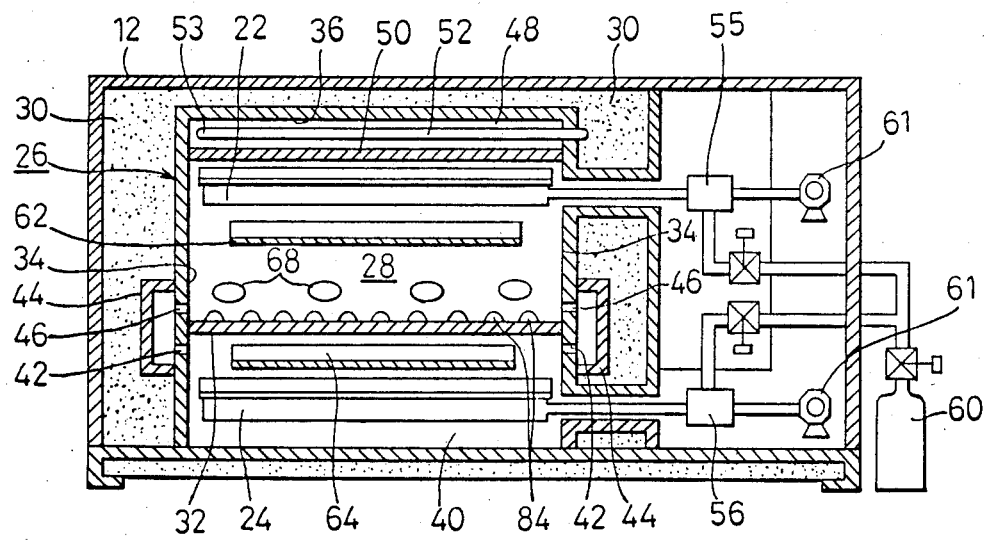
FIG. 2 is a cross sectional view taken along line II—II of FIG. 1.
Figure 3:
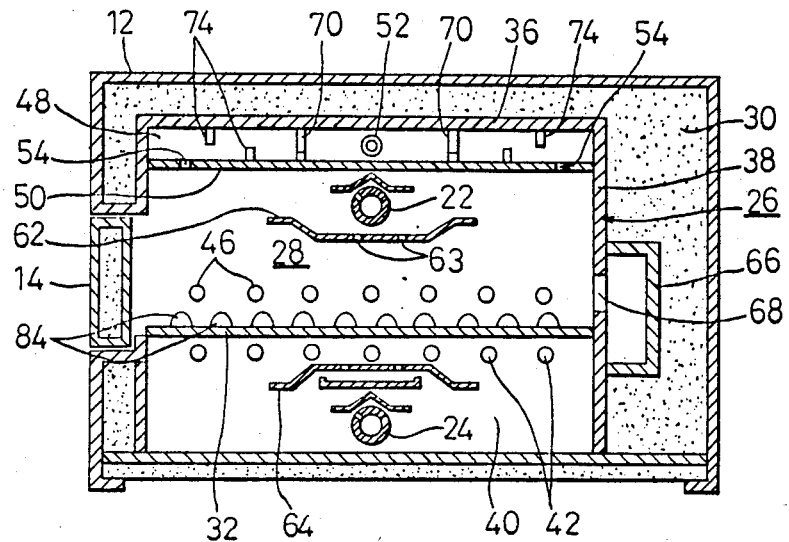
FIG. 3 is a cross sectional view taken along line III—III of FIG. 1.

Referring to FIGS. 1, 2 and 3, there is shown a gas cooking oven 10 in perspective view comprising a sheet metal outer cabinet or body structure 12 having an open front adapted to be closed by an access door 14, an exhaust means 16 provided at the rear of the body 12, and oven burner control components 18 and 20 for controlling the amount of fuel supply to an upper gas burner 22 and a lower gas burner 24, respectively. As best seen in FIGS. 2 and 3, the body structure 12 includes a box-like oven liner 26 which cooperates with the access door 14 to define an oven cooking cavity 28. A heavy layer 30 of thermal insulating material such as fiber glass or the like is placed around the oven liner 26 to retain the heat within the oven so that the heat losses from the oven body will be a minimum in order to conserve fuel. The oven liner 26 has a bottom wall 31, opposite vertical side walls 34, a top wall 36 and a rear wall 38. The cooking cavity 28 has a bottom wall formed by a removable baking plate that is adapted for carrying thereon articles of food such as dough pieces.

Located within the oven body 12 beneath the baking plate 32 is a fire box 40 which forms a combustion chamber for accommodating the lower gas burner 24. The fire box 40 is formed in each side wall 34 with a series of openings 42, as is best seen in FIG. 3. A first header or conduit 44 is provided along each side of the oven liner 26 outside thereof, and it is in communication with the combustion chamber 40 through the openings 42 to receive the hot flue gases from the chamber. The first headers 44 each have a series of flue gas outlet openings 46 formed in the side wall 34, which openings open into the cooking cavity 28, as is best seen in FIG. 3.

Assembled in the top of the cooking cavity 28 is a steam generating means which takes the form of a substantially boxlike compartment 48 partitioned by a horizontally disposed bottom plate 50. The compartment 48 has a water tube 52 provided therein extending generally from side to side of the compartment. The water tube 52 has a closed front end and is perforated along the entire length thereof to provide a plurality of water discharge nozzles. The other end of the water tube 52 is connected to a water line (not shown) so as to be supplied with clean water for generating hot steam. The compartment 48 also includes a plurality of steam discharge nozzles 54 extending through the bottom plate 50. A more detailed description of the structure and operation of the steam generating means 48 will be had later with reference to FIGS. 4 to 7 of the drawings.

The upper gas burner 22 is located beneath the steam generating compartment 48. There may be one burner or more than one burner as a matter of choice. The gas burner tube is mounted to the oven structure generally in vertical alignment with the water tube 52 in the steam generating compartment 48 for reasons to be discussed later. The upper and lower burners 22 and 24 may be of forced combustion type which does not require a supply of cold secondary air.

The upper and lower gas burners 22 and 24 are connected to respective mixers 55 and 56 so as to receive a combustible mixture of fuel gas and air therefrom. The mixers are connected to a source of fuel gas 60 via control valves that are operatively connected to the temperature setting knobs 18 and 20. Room ambient air is fed from blowers 61 into the mixers in order to provide the best performance.

A heat diffusing plate 62 is located between the upper gas burner 22 and the baking plate 32, as best shown in FIG. 3. The heat diffuser plate has a plurality of openings 63 formed in the bottom thereof so that the heat from the upper gas burner 22 will be transfered evenly to dough pieces on the baking plate 32. Another heat diffusing plate 64 is provided within the combustion chamber 40 and extends between the lower gas burner 24 and the baking plate 32.

There is a second but larger header 66 located at the rear of the oven liner 26 from side to side thereof for use as an exhaust means. The second header has a plurality of openings 68 which open into the cooking cavity 28 for receiving the flue gases therefrom. It is important that the openings 68 be positioned slightly above the baking plate 32 to minimize the heat escaping from the oven cavity so as to conserve fuel, as is different from the prior art arrangement where the exhaust means opens into the oven cavity near the top thereof. Although not shown, the second header 66 is in communication with the exhaust port 16 (see FIG. 1) and serves to discharge the used flue gases from the oven cavity into the surrounding or kitchen atmosphere.

Figure 4:
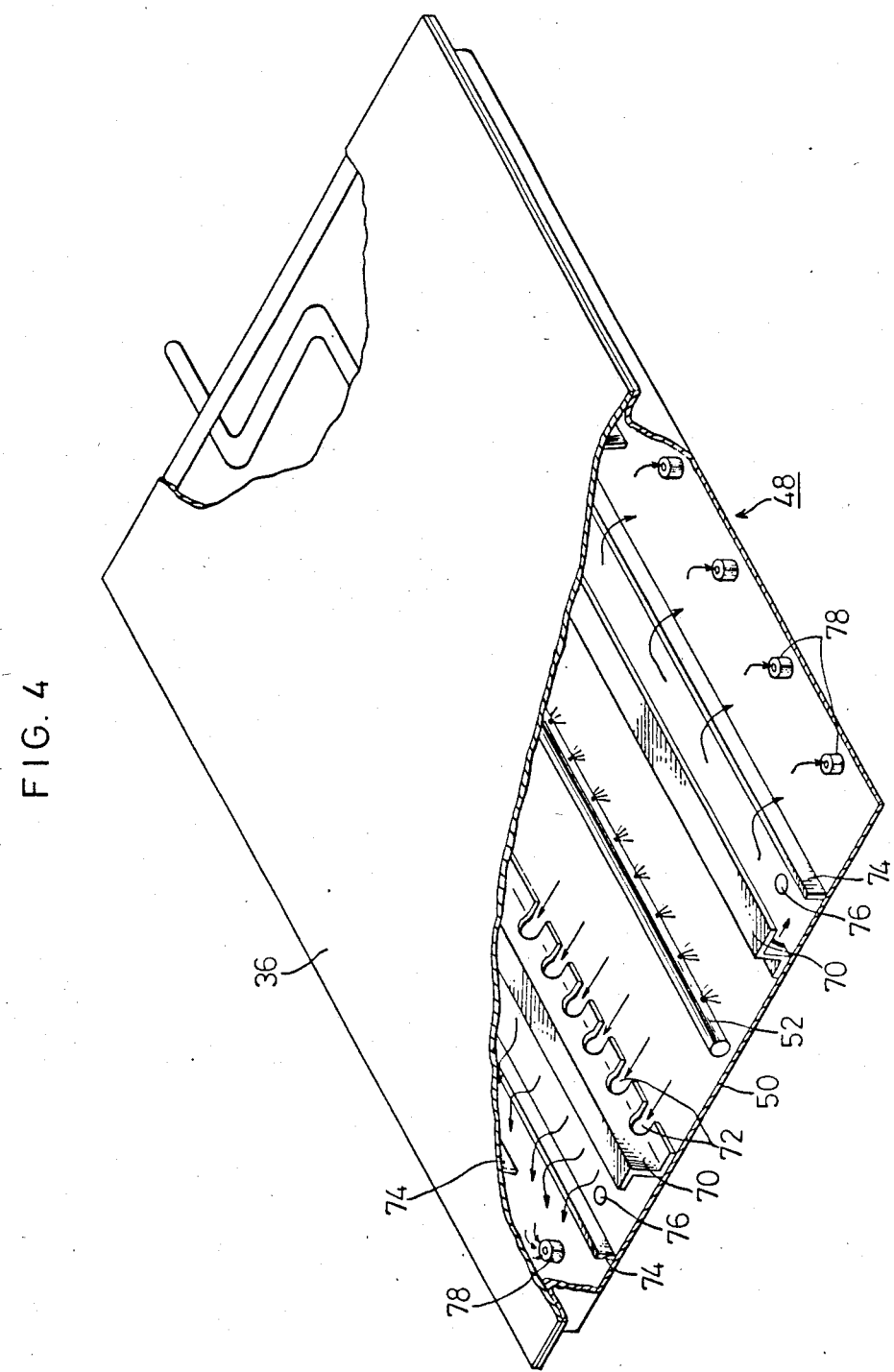
FIG. 4 is a perspective view of the steam generating compartment with parts broken away to show the manner in which the steam generated therein flows into steam discharge nozzles.

FIG. 4 shows a preferred form of the steam generating compartment 48 in more detail. In the compartment, there are two partitions 70 extending on both sides of the water tube 52 in parallel relation thereto. Each partition 70 has a plurality of openings 72 formed at the bottom thereof. A pair of baffle plates 74 are located outside each partition 70, one extending upwardly from the bottom plate 50 and the other depending from the top wall 36 of the cavity 28 with both baffle plates not in alignment with each other. Drain ports 76 are provided in the bottom plate 50 between the partitions 70 and their adjacent baffle plates 74, and they are in communication with the outside of the cooking cavity 28 via suitable conduits (not shown) made of heat resistant material.

The steam generating compartment 48 also includes a series of steam discharge nozzles 78 provided in the bottom plate 50 outside each baffle plate 74, that is, along the front end and rear end of the cooking cavity, as is best seen in FIG. 3. Each steam discharge nozzle comprises a generally cylindrical body with a central aperture or hole extending axially through the body.

The baffle plates 74 as well as the drain ports 76 serve to prevent the overflowing water from entering into the cooking cavity through the steam discharge nozzles 78 being entrained by the steam. It is preferable that the water tube 52 and the tube of the upper gas burner 22 be positioned in vertical alignment with each other to provide the maximum efficiency of steam generation.

The water tube 52 has a closed end 80 and is perforated along its length on both sides thereof to provide a plurality of water discharge nozzles. Each nozzle 82 is arranged to direct a spray of water obliquely toward the heated surface of the bottom plate 50 of the steam generating compartment 48. In order to increase the efficiency of steam generation, the water tube 52 is supplied with pre-heated water from a water line (not shown) which is arranged to extend along the back side of the oven so that the water passing therethrough receives the heat from the oven before reaching the steam generating compartment. It should be appreciated that the steam generating means could be formed by a separate body which is mounted on the top wall 36 of the cooking cavity. It should also be understood that if more than one upper gas burner is employed in the cooking cavity, the steam generating means may advantageously be divided into the same number of compartments as the burners.

As described previously, the perforated water tube 52 is connected to the water supply line for spraying the preheated water onto the bottom plate 50 on both sides of the tube at a proper rate. Since the bottom plate 50 is heated to over 220° C. by the upper gas burner 22, the sprayed water will be momentarily converted into hot steam. The thus generated hot steam passes through the openings 72 of the partitions 70 and over the baffle plates 74 and is allowed to flow into the cooking cavity 28 through the steam discharge nozzles 78. The steam entering into the cooking cavity passes over and touches dough pieces 84 on the baking plate 32, providing the baked French bread a glossy appearance and a hard crust.

During the baking operation, the flue gases generated from the upper gas burner 22 transfers heat to the baking plate 32 and the dough pieces 84 carried thereon by convection currents and by radiation from the hot gases which flow out of the gap between the heat diffuser plate 62 and the bottom wall of the steam generating compartment 50 and also from the heat duffuser plate per se. On the other hand, the lower burner located in the fire box 40 heats the underside of the baking plate 32 so that the dough pieces 84 on the baking plate will be heated indirectly. Convection currents of the hot flue gases generated by the lower gas burner 24 are allowed to flow into the first header 44 through the openings 42 and then enter into the cooking cavity 28 through the openings 46. There the flue gases will move upwardly and are allowed to circulate within the cavity by natural convection. Accordingly, it will be appreciated that the flue gases entering into the cavity from the fire box 40 also transfer heat to the dough pieces 84 by convection currents and by radiation. The used flue gases are allowed to flow out of the cavity through openings 68, the second header 66 and the exhaust port 16 into the surrounding atmosphere.

Figure 5:
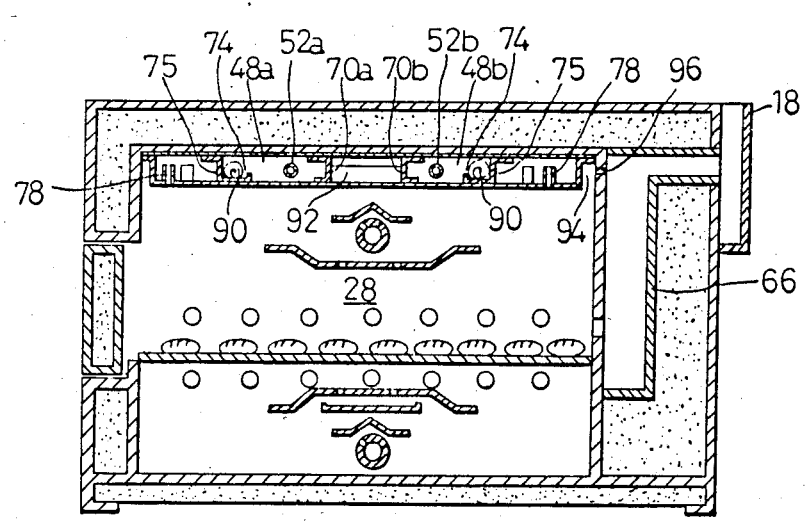
FIG. 5 is a view similar to FIG. 3, showing the manner in which the steam generating compartment of FIG. 4 is assembled into the gas cooking oven.

FIGS. 5, 6 and 7 illustrate a modification of the steam generating compartment of FIG. 4. This embodiment differs from that of FIG. 4 in the provision of two compartments adapted to be heated by a single gas burner 22. Each compartment 48a, 48b is provided near its inside wall or partition 70a, 70b with a water tube 52a, 52b whose openings, or water discharge nozzles are arranged to direct a spray of water toward its adjacent partition, that is, in a direction away from the steam discharge nozzles 78. This arrangement serves to prevent passage of hot water drops over the steam discharge nozzles by virtue of the distance at which the nozzles are located from the area where the sprayed water touches down the bottom plate 50.

There is a baffle means 74 located outside of each water tube 52a, 52b. Each baffle means 74 comprises an elongated channel-like member with a flat bottom, the outer wall 75 of each channel-like member extending vertically up to the top wall of the compartment. The inner wall 77 of each channel member 74 is of less height than the outer wall to provide a clearance or gap through which the generated steam flows outwardly into the channel portion of the baffle means 74. As best seen in FIG. 6, each outer wall 75 has a plurality of elongated slots or slits 79 near the bottom thereof which serve as a steam passage means.

Each baffle means 74 also includes an elongated water drop barrier 90 for preventing the passage of hot water drops over the cooking cavity 28 through the steam discharge nozzles 78. Preferably, the water drop barriers 90 may be fabricated by winding a wire gauze into an elongated coil form. This arrangement also assists in preventing the heated water from entering from the steam generating compartments into the cooking cavity 28 in drop form. A plurality of reinforcing ribs 92 may preferably be provided on the bottom plate 50 of the steam generating means so as to extend between the opposed partitions 70a and 70b over the area overlying the upper gas burner 22. The function of these reinforcing ribs is to prevent deformation of the bottom plate 50 of the steam generating compartments due to the localized heating provided by the underlying upper gas burner 22.

As is best seen in FIG. 5, the steam generating means 48 is formed by a separate, substantially box-like body which is mounted to the top wall 34 of the cooking cavity 28 with a gap 94 formed between the rear wall of the box and the rear wall 38 of the cavity. The rear wall 38 of the cavity is formed near the top thereof with a series of oven outlet openings 96 which provide communication between the gap 94 in the cooking cavity and a second or larger header 66 leading to the exhaust port 18. The exhaust port 18 extends from side to side of the oven along the back side thereof. Our experiments have shown that the oven of this construction has the advantage of an ease of ignition during cold winter mornings as compared with the oven design of FIGS. 2 and 3. One conceivable reason for this might be that in the arrangement of FIGS. 2 and 3 the absence of oven vent openings, such as openings 96 tends to cause the steam trapped within the cavity to condense when the cavity temperature drops an extended period of time after the oven is turned off, with the result that the condensate might activate a safety device (not shown) for the ignition device (see FIG. 13) of the upper gas burner 22 to cut off the gas supply to the burner. On the other hand, with the arrangement of FIG. 5, the openings 96 serve as an oven vent means allowing the steam to exit into the second header 66 and then to the exhaust port 16, thereby preventing the undesirable activation of the safety device. However, in order to minimize the heat losses from the cooking cavity 28 through the vent openings 96, it would be desirable to reduce the number or size of such vent openings to the fullest extent possible that the ease of ignition is afforded as described above.

FIGS. 8 to 10 illustrates a preferred form of gas burner assembly 100 adapted for use as the upper and/or lower gas burner in the present baking oven. The burner assembly 100 comprises a hollow, straight tube 102 having a closed front end 104, which is provided along the length thereof with two continuous lines of perforations or gas discharge nozzles 106. The gas discharge nozzles serve to emit a combustible mixture of fuel gas and air upwardly but obliquely.

The nozzles 106 are arranged such that the amount of the gas fuel mixture emitted from each nozzle will be substantially the same thus generating a substantially equal amount of heat energy along the length of the tube 102. To accomplish this, the gas discharge nozzles 106 may be so sized to be progressively smaller toward the closed front end 104 of the tube, as shown in FIG. 9. Alternatively, the number per unit length of the nozzles 106 may be progressively smaller toward the closed end of the tube, as shown in FIG. 10. It is possible to adjust the discharge rate of each nozzle 106 by means of a cover plate (not shown) adjustably mounted on the tube.

The burner 100 has a flame transmitting plate 108 located immediately above the perforated burner tube 102, which plate is somewhat different in construction from that shown in FIGS. 2 and 3.

An igniter plate 110 is mounted to the burner tube 102 in juxtaposition with the rear end of the flame transmitting plate 108 to encompass the area where some additional nozzles (not shown) are formed to facilitate ignition.

An ignition device 112 comprises the igniter plate 110, an elongated spark element 114 and a probe 116 of a flame detector 118, the spark element and the probe being arranged to extend into openings 120 formed in the opposite side walls 122 of the igniter plate 110.

The gas burner 100 is connected through a conduit 124 to a mixer head 126. The mixer head is of the low pressure type capable of producing a combustible mixture of fuel gas and air by mixing the fuel gas from a gas source (not shown) with a controlled amount of ambient air fed from a blower 128 through an air line 130, as is best seen in FIG. 11. The blower 128 includes an air inlet 132 and a valve 134 which takes the form of an apertured plate movably mounted to the blower block to vary the opening of the air inlet 132 depending upon the angular position of the plate. A mounting bracket 136 is used to fixedly mount the burner assembly with respect to the oven structure. Although not shown, a gas valve is employed to cooperate with the blower 128 to regulate the amount of fuel gas supply to the mixer 126 through a gas line 138 in dependence upon the amount of air supply from the blower 128 in order to provide the best performance. This arrangement eliminates the need for a supply of secondary air which would otherwise cause a reduction in the oven cavity temperature, and permits the fuel gas to be fed to the burner tube 102 at a relatively low pressure.

During ignition, the gas valve is kept open for approximately three seconds during which the flame detector 118 senses electric sparks to cause the gas valve to remain open. Once activated, the igniter element keeps producing sparks for a period of approximately 3 to 10 seconds to ignite the combustible mixture. In case of a failure to ignite the mixture, the ignition element is reactivated and operates to close the gas valve and provide an audible alarm signal if a second attempt fails. As described previously in connection with FIGS. 9 and 10, the gas burner tube 102 is so arranged to produce a substantially equal amount of heat output along the length thereof in order to bake the dough pieces 84 evenly.

FIG. 12 shows another form of gas burner assembly 100' which comprises a cylindrical burner tube 102' having a closed end 104' and two continuous lines of gas discharge nozzles 106' formed in parallel to each other in the upper curved surface of the tube. Two short lines of gas discharge nozzles 150 and 152 are formed in the tube's front end portion and rear end portion, respectively, to transmit a flame between the two long lines of gas discharge nozzles 106' so as to ensure that all the gas nozzles 106' will be ignited without fail.

The gas burner assembly 100' also includes a flame transmitting member 108' divided into three segments, that is, a first flame transmitting plate 108'a, a second or intermediate flame transmitting plate 108'b, and a third flame transmitting plate 108'c, all being securely mounted to the upper surface of burner tube 102'. The flame transmitting member 108' may be divided into more than three segments depending upon the tube length and other design factors.

The first flame transmitting plate 108'a has a plurality of mounting holes 154 of oblong shape. These oblong holes are formed in alignment with corresponding holes 156 of circular shape in the burner tube 102' to accommodate the differential in thermal expansion between the flame transmitting plate 108'a and the burner tube 102', thereby preventing the warpage of the plate. The first flame transmitting plate 108'a also includes a generally circular opening 158 in alignment with a mounting hole 160 provided in the tube 102'. The reason for the circular shape of the opening 158 is to prevent the first flame transmitting plate 108'a from covering and blocking the gas discharge nozzle 152 during the thermal expansion of the plate.

The second or intermediate flame transmitting plate 108'b also has formed therein a plurality of mounting holes 162 which are of oblong shape except the middle circular hole 164.

In a like manner, the third flame transmitting plate 108'c has a plurality of mounting holes 166, and only one hole 168 is of circular shape. The circular hole 168 is disposed adjacent the gas discharge nozzles 150 in the front end portion of the tube. Thus, during the thermal expansion of the plate 108'c, it will not block the nozzles 150, and the oblong holes will absorb the thermal expansion of the plate 108'c.

As shown, the first, second and third flame transmitting plates 108'a, 108'b and 108'c are securely mounted to the burner tube 102' in tandem with a predetermined spacing between each two adjacent plates in order to accommodate the differential in the thermal expansion of the plates and the tube thereby preventing the deformation of the plates and of the tube per se.

The gas burner assembly 100' also includes two additional channel-like flame transmitting plates 108'd and 108'e. These plates 108'd and 108'e are mounted on top of the three flame transmitting plates 108'a, 108'b, 108'c in a manner to span or bridge the gaps between the first and second plates 108'a and 108'b and also between the second and third plates 108'b and 108'c respectively. This bridging arrangement serves to prevent a reduction in the flame transmitting capability of the three-segmented member. In a like manner, the additional flame transmitting plates 108'd and 108'e each have a generally circular mounting hole 170, 172, and also an oblong mounting holes 174, 176, respectively. The circular hole 170 is formed in alignment with the oblong hole 154 in the first flame transmitting plate 108'a and their corresponding hole 156 in the burner tube 102' to receive therein a fastening means such as a screw 180. In a like manner, the oblong hole 174 in the flame transmitting plate 108'd is in alignment with the oblong hole 162 disposed adjacent the rear end of the intermediate flame transmitting plate 108'b and also with their corresponding hole 182 in the burner tube 102'. The mounting for the flame transmitting plate 108'e may be by means of two screws, one received in three holes 176, 162 and 184 and the other received in three holes 172, 166 and 186. It will be appreciated by those skilled in the art that the additional flame transmitting plates 108'd and 108'e each could be formed as an integral part of one of the underlying flame transmitting plate 108'a, 108'b and 108'c and fastened to the other of the underlying plates as by screw means.

The burner assembly 100' also includes a flame transmitting cover plate 188 located at the front end of the tube 102' and an ignition plate 190 provided at the opposite end thereof. Both plates are mounted on the burner tube in such a manner that their main horizontal portions cover, but are spaced from, the gas discharge nozzles 150 and 152 in the upper surface of the tube, to thereby promote the flame transmitting capability of the nozzles 150 and 152. In a like manner, the flame transmitting cover plate 188 has a circular mounting hole 192 in the main horizontal portion thereof, and the ignition plate 190 includes a centrally located circular hole 193 and an oblong hole 194 which are in alignment with corresponding openings in the burner tube 102'. When in an assembled condition, the overlapping portions of the ignition plate 190 and the first flame transmitting plate 108'a are slightly spaced from each other. As a distinct possibility, the high combustion temperatures encountered would tend to cause both the ignition plate and the first flame transmitting plate 108'a to expand or flex, urging against each other, with the resultant deformation of one or both plates. The present design obviates this disadvantage by cutting away portions of the side walls 196 of the ignition plate at 198 so that both plates will not abut each other during the thermal expansion thereof. The ignition plate 190 also has a pair of keyhole-like slits 200 formed in the side walls 196, the function of which is to increase the speed at which a flame transmits between the gas discharge nozzles 106'.

FIG. 13 illustrates another form of ignition device 202 which comprises a pair of ignition elements 204 mounted to the burner tube 102" by means of a mounting bracket 206. The ignition device is of electrical type capable of generating sparks to ignite the fuel mixture from gas nozzles 208, so that a series of gas discharge nozzles 210 will be successively ignited.

In this embodiment, it is preferable to keep the rotational speed of a blower 212 at a low value for a period of approximately 2 to 5 seconds during ignition to reduce the air supply in order to provide for a smooth and reliable ignition of the burner assembly. Our experiments have indicated that an optimum ignition condition is obtained by reducing the amount of air supply by 10 to 30 percent from the level required for complete combustion, while lowering the blast pressure.

In operation, the upper and lower burner assemblies 22 and 24 are ignited in the manner as described above. After the completion of the ignition process, the oven is charged by positioning in place the baking plate 32 carrying dough pieces thereon. Thereafter the cooking cavity is kept at the baking temperature, i.e., approximately 220° C., while, at the same time, drawing the steam into the cooking cavity to contact the dough pieces 84.

It is preferable to employ burners of forced combustion type, as the upper and lower gas burners, wherein a mixer 126 has a fuel gas inlet 138 leading from a gas reservoir 60 and an air inlet 130 leading from the blower 128 and operates to mix the gas and air supplied thereto. The resulting combustible mixture is then fed through a fuel line 124 to the upper and lower gas burners without necessitating a supply of secondary air for the combustion process.

Figure 14:
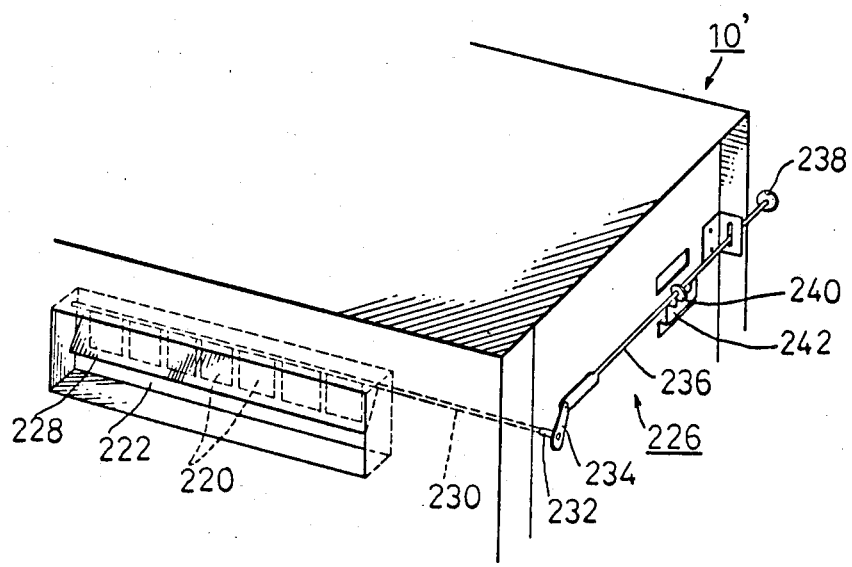
FIG. 14 is a fragmentary, perspective view of a gas cooking oven having an exhaust outlet provided with an adjustable damper.
Figure 15:
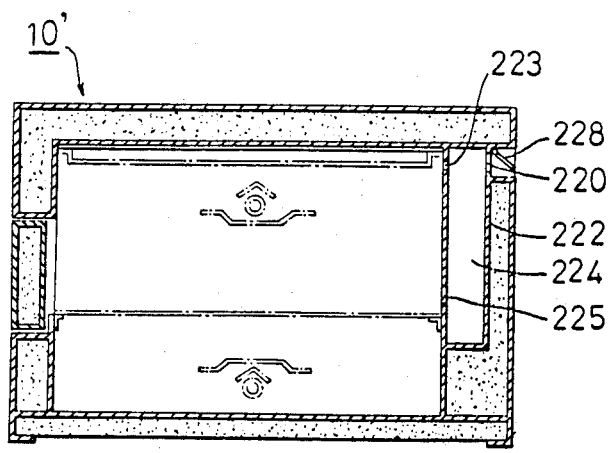
FIG. 15 is a cross sectional view of the gas cooking oven of FIG. 14 showing the manner in which a damper plate is mounted at the rear of the oven.

Referring to FIGS. 14 and 15, there is shown still another form of gas cooking oven 10' including an improved exhaust means which comprises a series of square openings 220 formed in the rear wall 222 of a second header 224 and a damper mechanism 226 for selectively closing or opening the exhaust openings. As shown, the damper mechanism includes a rectangular damper plate 228 mounted on the rear wall of the second header 224 for movement between a first position where the plate is vertically disposed to close the openings 220 and a second position where the plate is disposed away from the openings to discharge the exhaust gases therethrough. The damper plate is fixed to a first rod 230 which extends out through the oven housing at 232. The first rod 230 is connected at the other end to a crank 234. A second rod 236 is operatively connected to the crank 234 to rotate the first rod 230 and accordingly the damper plate 228 in response to the push-pull manipulation of the second rod 236. The second rod has a knob 238 attached to the other end thereof. The damper mechanism also includes a hook 240 fixedly mounted to the second rod 236, and a toothed plate 242 fixed to the side wall of the oven housing near the second rod and adapted to be latched by the hook. The hook cooperates with the toothed plate to provide for adjustment of the axial position of the second rod 236 relative to the oven body to thereby control the operative position of the damper plate 228.

Where it is desired to bake bread with a glossy appearance or with a relatively hard crust, it will be necessary to fill the cooking cavity 28 with hot steam by keeping the damper plate 228 in the first position to prevent the hot steam from escaping from the cooking cavity. On the other hand, where it is desired to bake cheese cakes, cream puffs or pudding which results in generation of a relatively large amount of steam, the damper plate 228 is held in the second or fully open position where the steam can escape from the oven cavity 28 in order to maintain the exposure to the steam at a proper level. In the ordinary use of the present baking oven, the damper plate may be opened halfway between the first and second positions as desired to minimize the heat losses from the oven body depending upon the amount of hot steam required for the type of foods being baked.

To recapitulate the important features of this invention:

(1) This gas oven design passes flue gases from the lower gas burner over the cooking cavity where they are allowed to circulate by natural convection together with those generated by the upper gas burner and to transfer heat to foods on the baking plate, as is different from the prior art arrangement wherein forced convection currents of hot flue gases are directed to foods being baked. This heat transfer or baking process enables the baking of sponge cakes or the like to have a soft surface.

(2) The provision of main oven exhaust outlets slightly above the baking plate rather than near the top wall of the oven cooking cavity results in an increased residence time of hot flue gases in the oven cooking cavity, which reduces the wasteful loss of heat into the surrounding atmosphere and lowers the consumption of gas fuel.

(3) The use of a separate mixer to produce a combustible mixture of fuel gas and air for each gas burner eliminates the need for a supply of cold secondary air to be drawn into the oven to feed the burner for the combustion process, thus reducing the fuel consumption.

(4) The pressurized condition (although at a relatively low level) in which the fuel mixture is fed to the gas burners eliminates the possibility for a flame to be extinguished by a momentary pressure increase in the oven cavity during oven door closings.

Numerous features and advantages of the invention have been set forth in the foregoing description, together with details of structure and function of the invention. The disclosure, however, is illustrative only, and changes may be made in detail without deviating from the true scope of the invention.

I claim:

1. A gas cooling oven comprising an oven body supporting a substantially box-like oven liner and a frontopening access door which defines an oven cooking cavity, a baking plate for carrying thereon foods to be baked, the baking plate being removably placed in the oven liner to form the bottom wall of the cooking cavity, a fire box located beneath the baking plate, first gas burner means positioned in the fire box, steam generating means located in the top of the cooking cavity to generate and supply hot steam thereto, and second gas burner means located adjacent to the steam generating means, the steam generating means receiving the heat from the second gas burner means to generate the steam which flows into the cooking cavity and contacts the foods as it passes over the baking plate, thereby enabling the baking of the foods to have desired properties, said steam generating means comprising compartment means, water tube means located in the compartment means and having at least one water discharge nozzle provided therein, the water tube means being adapted to received therein a supply of water, and nozzle means provided in the compartment means for discharging the generated steam into the oven cooking cavity.

2. A gas cooking oven as recited in claim 1 wherein the steam generating means further comprises means for preventing the passage of hot water drops from the compartment means over the cooking cavity.

3. A gas cooking oven as recited in claim 1 wherein the compartment means comprises a compartment formed in the top of the cooling cavity by a bottom plate which receives the heat from the second gas burner means to convert the water discharged onto the bottom plate into hot steam.

4. A gas cooking oven as recited in claim 1 wherein the compartment means comprises a separate, substantially boxlike body which is fixedly mounted on the top wall of the cooking cavity.

5. A gas cooking oven as recited in claim 2 wherein the means for preventing the passage of hot water drops comprises partition means provided on each side of the water tube means and having a series of openings formed at the bottom thereof, and baffle means provided outside each partition means to prevent the passage of hot water drops therethrough, the steam discharge nozzle means being provided outside each baffle means to receive the steam through the openings of the partition means and the baffle means and to discharge the received steam into the oven cooking cavity.

6. A gas cooking oven as recited in claim 5 wherein the baffle means each comprise a pair of baffle plates, one extending upwardly from the bottom wall of the compartment means and terminating at a height short of the top wall thereof, and the other depending from the top wall of the compartment means, both of the baffle plates being disposed not in vertical alignment with each other.

7. A gas cooking oven as recited in claim 1 wherein the steam generating means comprises a first and a second steam generating chambers provided in the top of the oven cooking cavity, a first and a second water tubes provided in the first and second steam generating chambers, respectively, the first and second water tubes being adapted to receive therein a supply of water, a first and a second series of steam discharge nozzles provided in the bottom walls of the first and second steam generating chambers, respectively, and operable to discharge the steam generated therein into the oven cooking cavity, and a first and a second baffle means provided in the first and second steam generating chambers, respectively, the first baffle means being located between the first water tube and the first steam discharge nozzles and also the second baffle means between the second water tube and the second steam discharge nozzles to trap hot water drops before reaching the first and second steam discharge nozzles, respectively, whereby the hot water drops are not discharged into the oven cooking cavity.

8. A gas cooking oven as recited in claim 7 wherein the first and second steam generating chambers each have a vertically disposed wall located on the side of the first and second water tubes opposite to the first and second baffle means, respectively, and the at least one water discharge nozzle of the first and second water tubes being arranged to direct a spray of water toward the vertically disposed walls of the first and second steam generating chambers so as to prevent the passage of hot water drops over the first and second steam discharge nozzles through the first and second baffle means, respectively.

9. A gas cooking oven as recited in claim 7 or 8 wherein the first and second baffle means each comprise an elongated channellike member having one side wall extending upwardly toward the top wall of the associated steam generating chamber but terminating at a height short of the top wall thereof, the other side wall of the elongated channel-like member extending upwardly up to the top wall of the associated steam generating chamber and having a series of elongated openings formed at the bottom thereof to pass the generated steam therethrough over the associated steam discharge nozzles, and an elongated water drop barrier made of coiled wire gauze and provided on the bottom of the associated elongated channel-like member.

10. A gas cooking oven as recited in claim 8 wherein the vertically disposed walls of the first and second steam generating chambers are connected to each other by means of at least one reinforcing rib to prevent deformation of the bottom plate of the compartment means due to the heat received from the second gas burner means.

11. A gas cooking oven comprising an oven body supporting a substantially box-like oven liner and a frontopening access door which defines an oven cooking cavity, a baking plate for carrying thereon foods to be baked, said baking plate being removably placed in the oven liner to form the bottom wall of the cooking cavity, a fire box located beneath the baking plate, first gas burner means positioned in the fire box, second gas burner means located above the baking plate, means for supplying steam the to oven cooking cavity, oven exhaust means in the rear of the oven body and leading into the cooking cavity, and damper means provided in the exhaust means to selectively control the opening thereof depending upon the kind of foods to be baked in the oven cavity, the exhaust means comprising at least one oven exhaust outlet in the rear wall of the cooking cavity, an exhaust header located outside the rear wall of the cooking cavity, the oven exhaust outlet opening into the exhaust header, and a plurality of openings in the rear wall of the oven body and leading into the exhaust header, and the damper means comprising a damper plate movably mounted at the rear of the oven body for movement between a first position to close the exhaust openings and a second position to fully open the exhaust openings, a first rod connected to the damper plate and rotatably mounted to the oven body to move the damper plate between the first and second positions, a second manually operable rod operatively connected to the first rod to rotate the first rod in response to the push-pull operation of the second rod, and means for holding the second rod at one of the plurality of axial operative positions as desired.

* * * * *